(12) United States Patent
Baseggio et al.

(10) Patent No.: US 11,535,087 B2
(45) Date of Patent: Dec. 27, 2022

(54) ELECTRIC HEATER COMPRISING FOUR INDEPENDENT HEATING REGIONS

(71) Applicant: DENSO THERMAL SYSTEMS S.P.A., Poirino (IT)

(72) Inventors: Daniele Baseggio, Poirino (IT); Ilario Grosso, Poirino (IT); Luca Bergamo, Poirino (IT); Annunziata Bruna Lorusso, Poirino (IT)

(73) Assignee: DENSO THERMAL SYSTEMS S.P.A., Poirino (IT)

( * ) Notice: Subject to any disclaimer, the term of this patent is extended or adjusted under 35 U.S.C. 154(b) by 414 days.

(21) Appl. No.: 16/866,692

(22) Filed: May 5, 2020

(65) Prior Publication Data

US 2020/0353792 A1 Nov. 12, 2020

(30) Foreign Application Priority Data

May 6, 2019 (IT) .................. 102019000006550

(51) Int. Cl.
 *B60H 1/22* (2006.01)
 *F24H 3/04* (2022.01)
 (Continued)

(52) U.S. Cl.
 CPC ......... *B60H 1/2225* (2013.01); *F24H 3/0429* (2013.01); *F24H 9/1872* (2013.01);
 (Continued)

(58) Field of Classification Search
 CPC ............. B60H 1/2225; B60H 1/00392; B60H 1/2215; B60H 1/2218; B60H 2001/2228; B60H 2001/2268; B60H 2001/2237; B60H 2001/2287; F24H 3/0429; F24H 3/1872; F24H 9/1863; H05B 3/40; H05B 3/48;
 (Continued)

(56) References Cited

U.S. PATENT DOCUMENTS

2004/0169027 A1  9/2004  Bohlender et al.
2015/0183295 A1  7/2015  Trapp et al.

FOREIGN PATENT DOCUMENTS

CN   100402941 C  *  7/2008  .............. B60H 1/08
EP   1626231 A1      2/2006
WO   WO-03088712 A2 * 10/2003  ........... B60H 1/2225

OTHER PUBLICATIONS

Italian Search Report and Written Opinion for IT Patent Application No. IT201900006550, dated Nov. 14, 2019, 7 pages.

* cited by examiner

*Primary Examiner* — Shawntina T Fuqua

(74) *Attorney, Agent, or Firm* — Armstrong Teasdale LLP

(57) ABSTRACT

A positive temperature coefficient electric heater for a vehicle includes a support part, a control circuitry, and a first and a second radiating layers overlapping one another, each radiating layer having a plurality of heating rods extending from the support part and connected in parallel to the control circuitry. Each radiating layer has a first layer sector and a second layer sector controlled independently of one another. The radiating layers may be controlled independently of one another. In the first radiating layer, the second section of the heating rods is capable of generating greater thermal power than the first section of the heating rods and, in the second radiating layer, the first section of the heating rods is capable of generating greater thermal power than the second section of the heating rods.

2 Claims, 2 Drawing Sheets

(51) Int. Cl.
   *F24H 9/1863*     (2022.01)
   *H05B 3/40*       (2006.01)
(52) U.S. Cl.
   CPC ....... *H05B 3/40* (2013.01); *B60H 2001/2228* (2013.01); *B60H 2001/2268* (2013.01); *H05B 2203/02* (2013.01)
(58) Field of Classification Search
   CPC ... H05B 3/42; H05B 3/06; H05B 3/50; H05B 3/14; H05B 2203/02; H05B 2203/023
   See application file for complete search history.

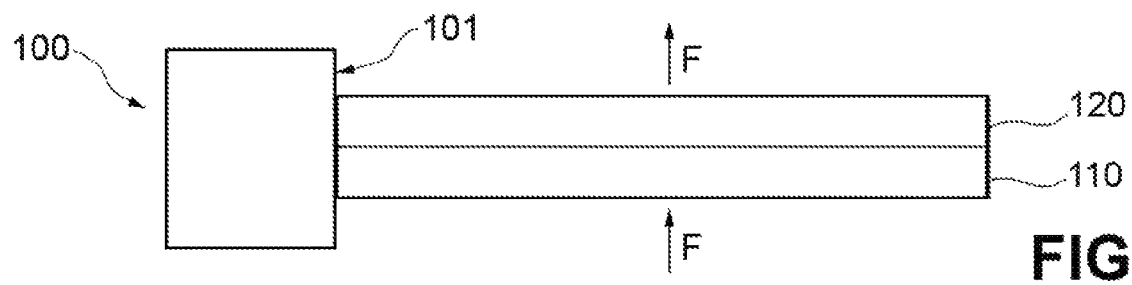
FIG.3
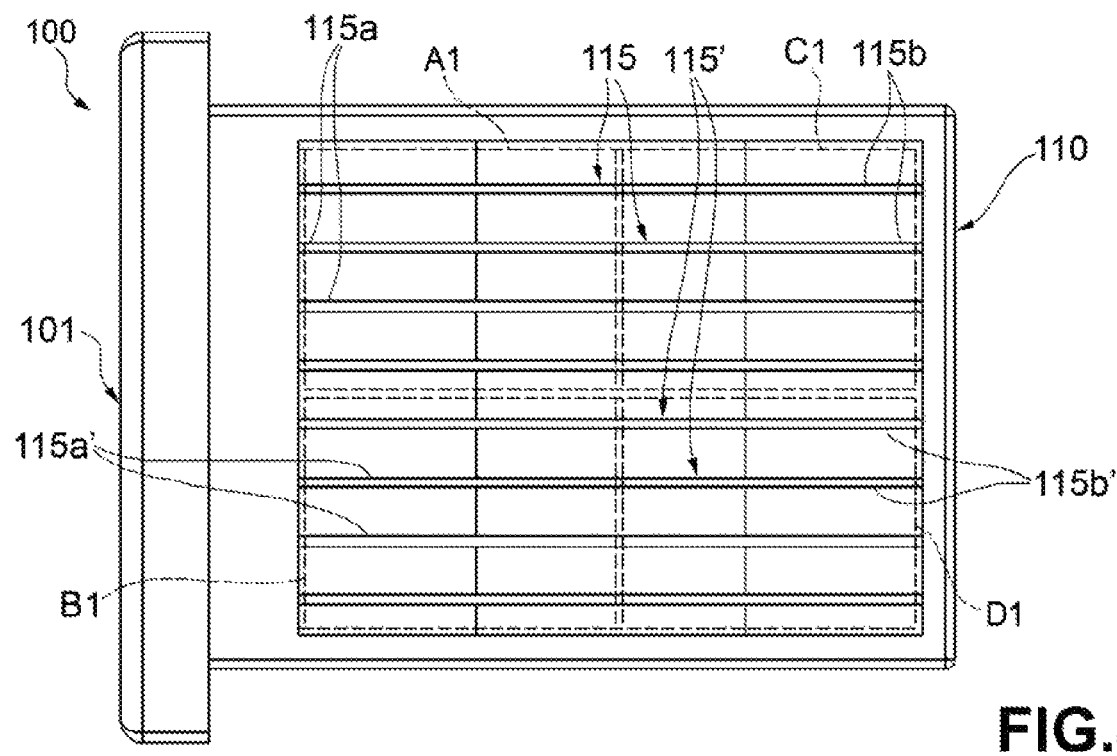
FIG.4
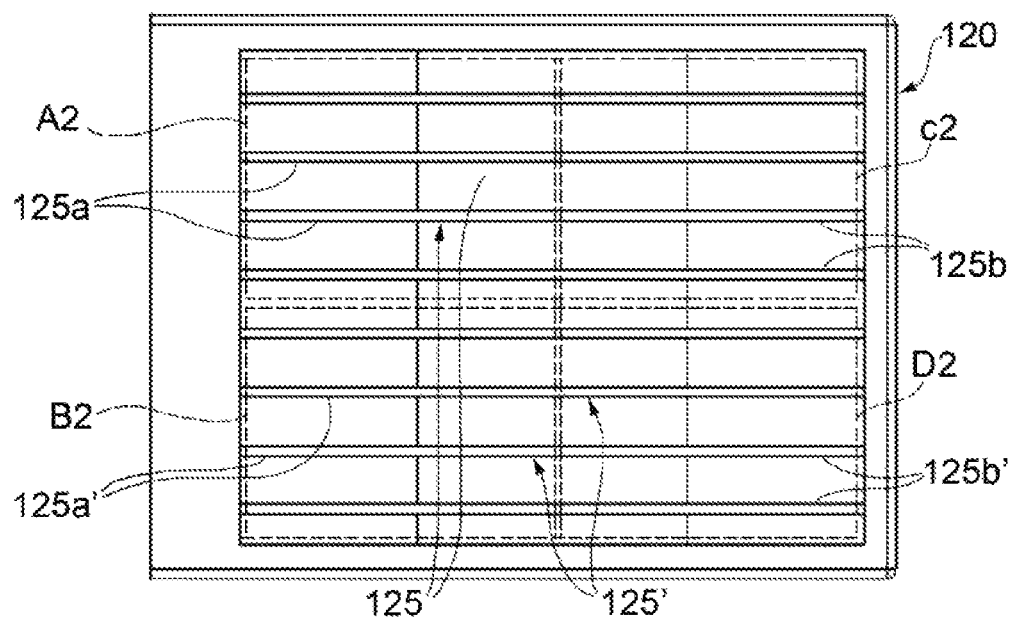

ELECTRIC HEATER COMPRISING FOUR INDEPENDENT HEATING REGIONS

CROSS-REFERENCE TO RELATED APPLICATION

This application claims priority to and benefit of Italian Patent Application No. 102019000006550 filed May 6, 2019, the contents of which are incorporated by reference in their entirety.

FIELD OF THE INVENTION

The present invention relates to heating devices used in air-conditioning units in motor vehicles.

BACKGROUND OF THE INVENTION

In electric vehicles, it is known to use electric heaters, in particular heaters that use positive temperature coefficient (PTC) resistors. Air-conditioning units for electric vehicles are generally free of heating mass and can be devoid of mixing doors.

The technical solutions known to date make it possible to provide single-zone air-conditioning units, or at most dual-zone air-conditioning units, with the application of a single high-voltage electric heater.

FIG. 1 shows a high-voltage PTC heater according to the prior art, which is indicated as a whole by 1.

The heater 1 comprises a support part 11 designed to make it possible to mount the heater 1 on an air-conditioning unit (not shown) such that the heater 1 is arranged inside a duct for distributing air in order to intercept a flow of air to be heated. The heater 1 also comprises a control circuitry 12 housed in the support part 11 and shown schematically by a rectangle in FIG. 1.

The heater 1 also comprises a plurality of heating rods, indicated by 15 and 15'. The heating rods 15, 15' extend from the support part 11 and are connected in parallel to the control circuitry 12. Each heating rod 15, 15' comprises a string of positive temperature coefficient (PTC) elements or thermistors connected in parallel (not shown). The PTC elements are distributed inside the single heating bar 15, 15' such that the thermal power generated is substantially uniform along the length of the heating rod 15, 15'.

A sub-unit formed by the heating rods indicated by 15 identifies a first sector of the active region of the heater, which is indicated by A in FIG. 1. Another sub-unit formed by the heating rods and indicated by 15' identifies a second sector of the active region of the heater, which is indicated by B in FIG. 1. The first sector A and the second sector B may be controlled independently of one another by means of the control circuitry 12. More than two sectors that can be controlled independently of one another may also be provided in the heater.

The known heater shown in FIG. 1 makes it possible to provide a dual-zone air-conditioning unit if is inserted into a duct for distributing air that makes it possible to separate a flow of air leaving the heater into two partial flows.

An air-conditioning unit having more than two zones may be formed by suitably arranging two separate heaters of the type described above in the unit. This solution, however, is not acceptable since it doubles the number of components, and consequently increases dimensions, costs and installation complexity and decreases serviceability.

SUMMARY OF THE INVENTION

One object of the present invention is to provide an air-conditioning unit having more than two zones, for example a three-zone or four-zone unit, without having to use two separate dual-zone heaters.

In view of this object, the present invention provides an electric PTC heater for a vehicle, comprising
  a support part and control circuitry housed in the support part,
  a first radiating layer and a second radiating layer overlapping one another and designed such that a flow of air flows therethrough, each radiating layer comprising a plurality of heating rods extending from the support part and connected in parallel with the control circuitry, each of said heating rods having a first section that is adjacent to the support part and a second section that is remote from the support part,
  wherein each radiating layer comprises a first layer sector and a second layer sector that may be controlled independently of one another by means of the control circuitry,
  wherein the radiating layers are connected in parallel to the control circuitry and can be controlled independently of one another by means of the control circuitry, and
  wherein the heating rods are designed in such a way that, in the first radiating layer, the second section of the heating rods is capable of generating greater thermal power than the first section of the heating rods, and, in the second radiating layer, the first section of the heating rods is capable of generating greater thermal power than the second section of the heating rods.

According to the present invention, two radiating bodies, each of which comprises two independent heating zones, are integrated in a single component and are controlled in parallel by a single electronic unit. The heating rods are also designed to allow for an imbalance of the thermal power generated between one section and the other of the heating rods, said imbalance being inverted between the two radiating bodies or layers. By suitably controlling each radiating layer and each radiating layer sector, different thermal powers may occur in four separate areas, thus combining the effect of the two radiating layers.

The fact that the heater according to the invention is formed as a single component provides several advantages over the solution described above, in which two separate conventional heaters are used, including greater ease of installation, smaller dimensions, lower costs and better serviceability.

Additional features and advantages of the heater according to the present invention will become more evident from the following detailed description of an embodiment of the invention, provided by way of non-limiting example, with reference to the drawings.

BRIEF DESCRIPTION OF THE DRAWINGS

FIG. 3 is a plan view of the heater in FIG. 2; and

FIG. 4 is a front view of the heater in FIG. 2, in which the two radiating layers of the heater are shown separately from one another.

DETAILED DESCRIPTION

Figure 1:
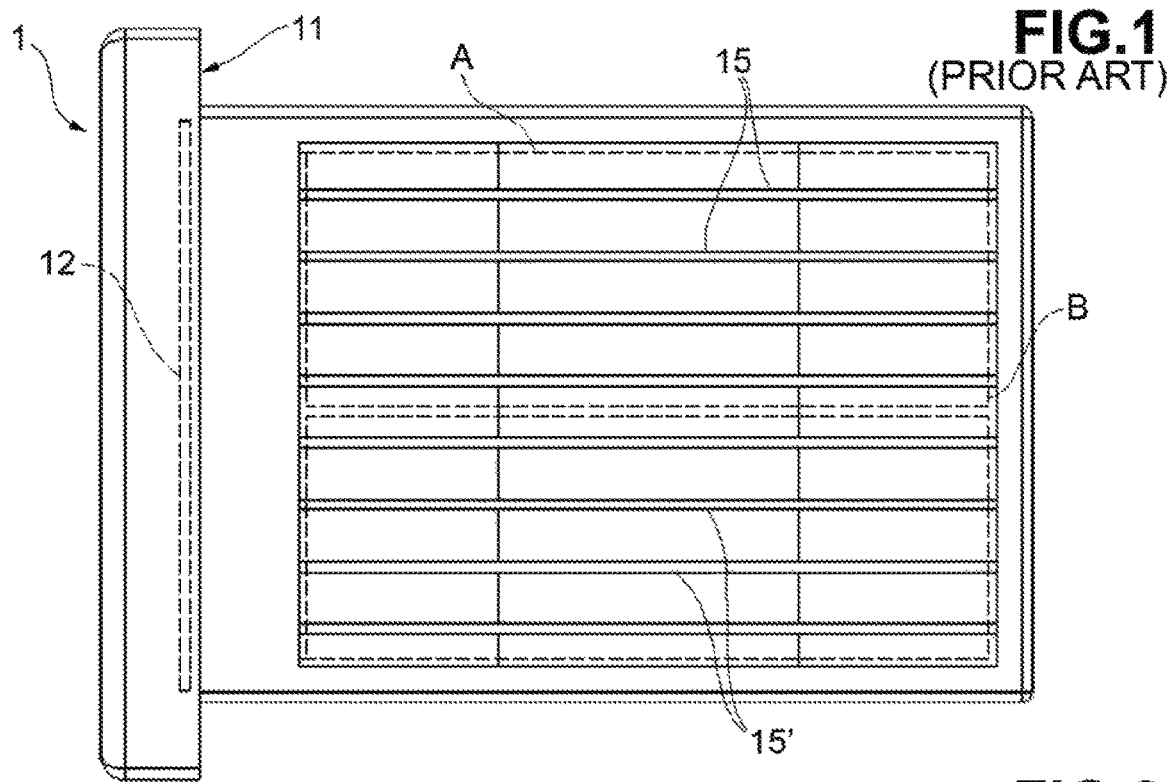
FIG. 1 is a front view of a dual-zone PTC heater according to the prior art.
Figure 2:
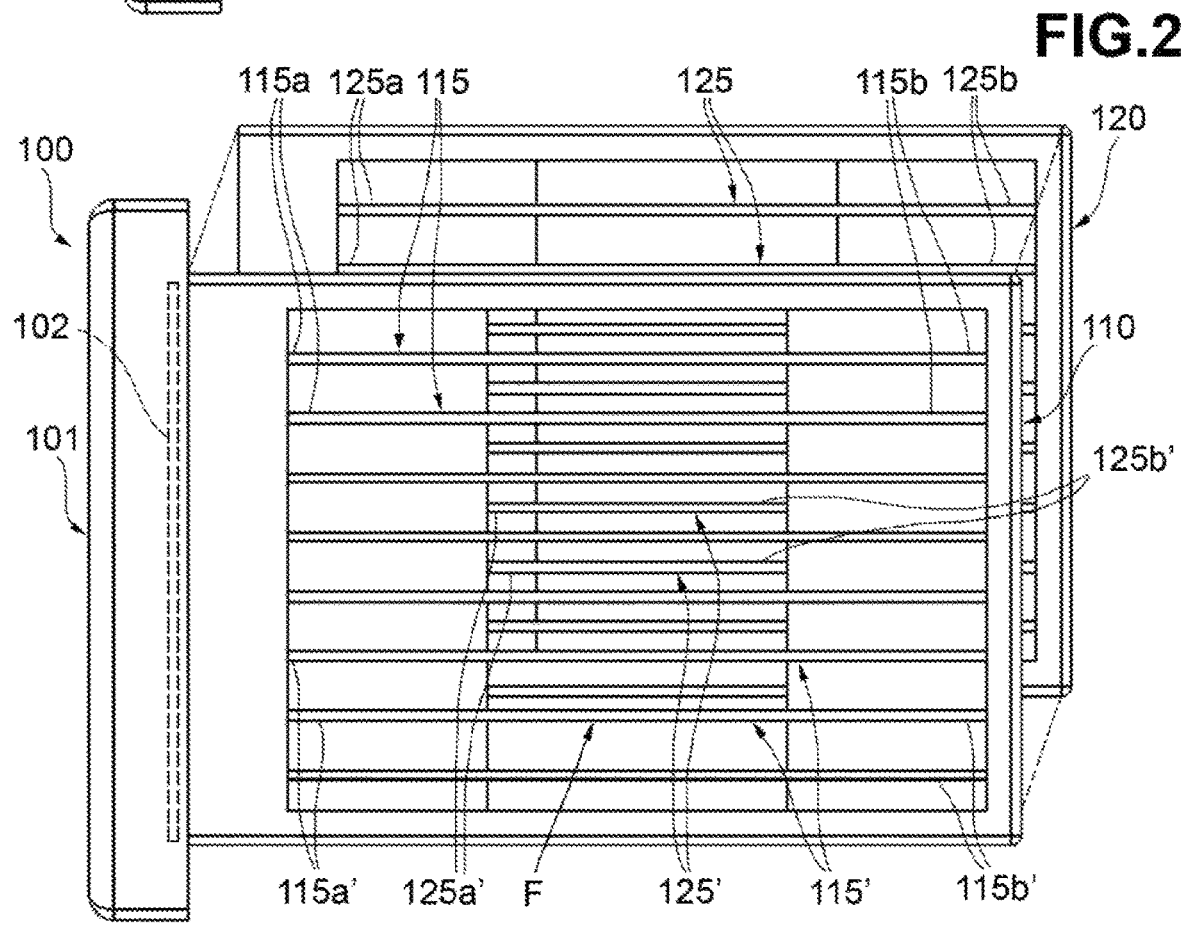
FIG. 2 is an exploded view of a heater according to the present invention.

FIG. 2-4 show a high-voltage PTC heater according to the invention, which is indicated as a whole by 100.

The heater 100 comprises a support part 101 designed to allow the heater 100 to be mounted on an air-conditioning unit (not shown) such that the heater 100 is arranged inside a duct for distributing air in order to intercept a flow of air to be heated. The heater 100 also comprises a control circuitry 102 housed in the support part 101 and shown schematically by a rectangle in FIG. 2.

The heater 100 also comprises a first and a second radiating body or layer 110 and 120 that overlap and are designed such that a substantially orthogonal flow of air flows therethrough, the direction of which is shown by arrow F in FIGS. 2 and 3. The two radiating layers 110 and 120 are arranged one downstream of the other with respect to the direction of the air flow. For the sake of convenience, in the following the furthest upstream layer will be referred to as the "first layer" and the furthest downstream layer as the "second layer." These terms, however, are not intended to be limiting, the furthest downstream layer may instead be referred to as the "first layer" and the furthest upstream layer as the "second layer."

Each radiating layer 110, 120 comprises a plurality of heating rods, which are indicated by 115 and 115' in relation to the first radiating layer 110, and by 125 and 125' in relation to the second radiating layer 120. The heating rods 115, 115', 125, 125' extend from the support part 101 and are connected in parallel with the control circuitry 102. Each heating rod 115, 115', 125, 125' comprises a string of PTC elements or thermistors connected in parallel (not shown). The PTC elements are arranged inside each heating rod 115, 115', 125, 125' such that the thermal power is imbalanced between a section that is adjacent to the support part 101, hereinafter referred to as the first section and indicated by reference numbers 115a, 115a', 125a, 125a' in FIG. 2, and a section that is remote from the support part 101, hereinafter referred to as the second section and indicated by reference numbers 115b, 115b', 125b, 125b' in FIG. 2. The thermal power imbalance may be obtained by the two sections of each heating bar being designed differently in per se known manners. For example, the number of thermistors per unit of length may be different between the first section and the second section. Or, the electric characteristics of the thermistors of the first section can be different from those of the thermistors of the second section.

A sub-unit formed by the heating rods of the first radiating layer 110, which are indicated by 115, identifies a first sector of the active region of the first radiating layer 110. This first sector is formed by two heating zones, indicated by A1 and C1 in FIG. 4. Zones A1 and C1 are associated with the first section 115a of the heating rods 115 and with the second section 115b of the heating rods 115, respectively. Zones A1 and C1 therefore differ from one another in that they are able to generate different thermal powers as a result of the imbalance described above; for example, heating zone C1 is able to generate greater thermal power than heating zone A1. Another sub-unit formed by the heating rods, which are indicated by 115', identifies a second sector of the active region of the first radiating layer 110. This second sector is formed by two heating zones, indicated by B1 and D1 in FIG. 4. Zones B1 and D1 are associated with the first section 115a' of the heating rods 115' and with the second section 115b' of the heating rods 115', respectively. Zones B1 and D1 therefore differ from one another in that they are able to generate different thermal powers by means of the imbalance described above; for example, heating zone D1 is able to generate greater thermal power than heating zone B1.

The first sector formed by the heating zones A1 and C1 and the second sector formed by the heating zones B1 and D1 may be controlled independently of one another by means of the control circuitry 102.

A sub-unit formed by the heating rods of the second radiating layer 120, which are indicated by 125, identifies a first sector of the active region of the second radiating layer 120. This first sector is formed by two heating zones, indicated by A2 and C2 in FIG. 4. Zones A2 and C2 are associated with the first section 125a of the heating rods 125 and with the second section 125b of the heating rods 125, respectively. Zones A2 and C2 therefore differ from one another in that they are able to generate different thermal powers as a result of the imbalance described above; for example, heating zone A2 is able to generate greater thermal power than heating zone C2. Another sub-unit formed by the heating rods indicated by 125' identifies a second sector of the active region of the second radiating layer 120. This second sector is formed by two heating zones, indicated by B2 and D2 in FIG. 4. Zones B2 and D2 are associated with the first section 125a' of the heating rods 125' and with the second section 125b' of the heating rods 125', respectively. Zones B2 and D2 therefore differ from one another in that they are able to generate different thermal powers as a result of the imbalance described above; for example, heating zone B2 is able to generate greater thermal power than heating zone D2. The imbalance in thermal power generated by the heating rods in the second radiating layer 120 is inverted with respect to the imbalance in the first radiating layer 110.

In the second radiating layer 120, the first sector formed by the heating zones A2 and C2 and the second sector formed by the heating zones B2 and D2 may be controlled independently of one another by means of the control circuitry 102.

Furthermore, the radiating layers 110 and 120 may be controlled independently of one another by means of the control circuitry 102.

The four heating zones A1, B1, C1 and D1 of the first radiating layer 110 overlap the four heating zones A2, B2, C2 and D2 of the second radiating layer 120, respectively, such that four heating zones are defined in the heater 100 overall: a first one, formed by overlapping zones A1 and A2, a second one, formed by overlapping zones B1 and B2, a third one, formed by overlapping zones C1 and C2, and a fourth one, formed by overlapping zones D1 and D2.

The thermal power in the first radiating layer 110 may be imbalanced such that, in zones A1 and B1 of the first radiating layer 110, which are adjacent to the support part 101, the thermal power generated by the heating rods 115, 115' is low, for example close to zero, and in zones C1 and D1 of the first radiating layer 110, which are remote from the support part 101, the thermal power generated by the heating rods 115, 115' is high, for example a few thousand watts. Inversely, the thermal power in the second radiating layer 120 may be imbalanced such that, in zones A2 and B2 of the second radiating layer 120, which are adjacent to the support part 101, the thermal power generated by the heating rods 125, 125' is high, for example a few thousand watts, and in zones C2 and D2 of the second radiating layer 120, which are remote from the support part 101, the thermal power generated by the heating rods 125, 125' is low, for example close to zero.

The heater may be designed such that zones A1 and B1 of the first radiating layer 110 and zones C2 and D2 of the second radiating layer 120 are not able to generate thermal power (for example by configuring them such that they are devoid of PTC elements) and such that zones C1 and D1 of the first radiating layer 110 and zones A2 and B2 of the second radiating layer 120 are each able to generate a power of 2000 W.

If the first sector (A1+C1) of the first radiating layer 110 is activated, for example, it will have a concentrated power of 2000 W in the quadrant formed by the overlapping zones C1 and C2.

Even if a concentrated power of 2000 W were to be desired in the quadrant formed by the overlapping zones B1 and B2, it would suffice to turn on the second sector (B2+D2) of the second radiating layer 120.

This would result in all the other combinations.

The present invention is not intended to be limited to the embodiments described and illustrated herein, but may be modified in terms of its shape and arrangement of parts, structural details and function, without thereby departing from the scope of protection, as described and claimed herein.

What is claimed is:

1. A positive temperature coefficient electric heater for a vehicle, the positive temperature coefficient electric heater comprising
   a support part and a control circuitry housed within the support part, and
   a first radiating layer and a second radiating layer superimposed to each other and configured to be passed through by an air flow, each radiating layer comprising a plurality of heating rods, extending from the support part and connected in parallel to the control circuitry, each of the heating rods having a first section adjacent to the support part and a second section far from the support part,
   wherein each radiating layer comprises a first layer sector and a second layer sector controllable independently of each other through the control circuitry,
   wherein the first and second radiating layers are connected in parallel to the control circuitry and are controllable independently of each other through the control circuitry, and
   wherein the heating rods are configured in such a way that, in the first radiating layer, the second section of the respective heating rods is capable of generating a greater thermal power than the first section of the respective heating rods and, in the second radiating layer, the first section of the respective heating rods is capable of generating a greater thermal power than the second section, of the respective heating rods.

2. The positive temperature coefficient electric heater of claim 1, wherein each of the heating rods comprises a string of thermistors connected in parallel, wherein the first section and the second section of the heating rods of the first radiating layer have respective configurations of thermistors capable of generating thermal powers different from each other, and wherein the first section and the second section of the heating rods of the second radiating layer have respective configurations of thermistors capable of generating thermal powers different from each other.

* * * * *